US009563285B2

(12) United States Patent
Park et al.

(10) Patent No.: US 9,563,285 B2
(45) Date of Patent: Feb. 7, 2017

(54) MOBILE TERMINAL AND CONTROL METHOD THEREOF

(71) Applicant: LG ELECTRONICS INC., Seoul (KR)

(72) Inventors: Jongkyeong Park, Seoul (KR); Jiwon Yun, Seoul (KR); Hyeongu Kang, Seoul (KR); Nikolay Akatyev, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 60 days.

(21) Appl. No.: 14/618,671

(22) Filed: Feb. 10, 2015

(65) Prior Publication Data

US 2016/0098101 A1   Apr. 7, 2016

(30) Foreign Application Priority Data

Oct. 7, 2014   (KR) .................. 10-2014-0135254

(51) Int. Cl.
| | |
|---|---|
| *G09G 5/00* | (2006.01) |
| *G06F 3/0346* | (2013.01) |
| *G09G 5/377* | (2006.01) |
| *G06F 3/0481* | (2013.01) |
| *G06F 3/0482* | (2013.01) |
| *G06F 3/0484* | (2013.01) |
| *G01C 21/36* | (2006.01) |
| *G09G 5/14* | (2006.01) |

(52) U.S. Cl.
CPC ......... *G06F 3/0346* (2013.01); *G01C 21/3635* (2013.01); *G01C 21/3647* (2013.01); *G01C 21/3673* (2013.01); *G06F 3/0482* (2013.01); *G06F 3/04817* (2013.01); *G06F 3/04842* (2013.01); *G09G 5/14* (2013.01); *G09G 5/377* (2013.01); *G09G 2340/125* (2013.01); *G09G 2340/14* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 2009/0125234 A1* | 5/2009 | Geelen | G01C 21/3647 701/533 |
| 2010/0035637 A1 | 2/2010 | Varanasi et al. | |
| 2011/0199479 A1* | 8/2011 | Waldman | G01C 21/3602 348/116 |

(Continued)

FOREIGN PATENT DOCUMENTS

| | | |
|---|---|---|
| EP | 2 489 230 A1 | 6/2012 |
| WO | WO 2006/132522 A1 | 12/2006 |

(Continued)

*Primary Examiner* — Xiao Wu
*Assistant Examiner* — Mohammad H Akhavannik
(74) *Attorney, Agent, or Firm* — Birch, Stewart, Kolasch & Birch, LLP

(57) ABSTRACT

A mobile terminal including a camera configured to obtain an image; a display unit configured to output map information; a sensing unit configured to sense a movement of the mobile terminal; and a controller configured to output a preview image received through the camera to at least part of a region where the map information is output, when the movement of the mobile terminal corresponds to a preset type of movement while the map information is output, and display one or more graphic objects related to the map information as being overlapped on the preview image.

13 Claims, 20 Drawing Sheets

(56) References Cited

U.S. PATENT DOCUMENTS

| | | | |
|---|---|---|---|
| 2013/0151141 A1* | 6/2013 | Orikasa | G01C 21/3626 |
| | | | 701/417 |
| 2014/0267403 A1 | 9/2014 | Maciocci et al. | |
| 2015/0193522 A1* | 7/2015 | Choi | H04L 67/22 |
| | | | 707/737 |
| 2016/0070412 A1* | 3/2016 | Shimazu | G06F 3/0416 |
| | | | 345/173 |

FOREIGN PATENT DOCUMENTS

| WO | WO 2011/100535 A1 | 12/2006 |
|---|---|---|
| WO | WO 2014/089669 A1 | 8/2014 |

\* cited by examiner

MOBILE TERMINAL AND CONTROL METHOD THEREOF

CROSS-REFERENCE TO RELATED APPLICATION

Pursuant to 35 U.S.C. §119(a), this application claims the benefit of earlier filing date and right of priority to Korean Application No. 10-2014-0135254, filed on Oct. 7, 2014, the contents of which is incorporated by reference herein in its entirety.

BACKGROUND OF THE INVENTION

1. Field of the Invention

This specification relates to a mobile terminal, and more particularly, a mobile terminal capable of providing map information, and a control method thereof.

2. Background of the Invention

A terminal is broadly categorized by mobility into a mobile terminal and a stationary terminal. The mobile terminal is further categorized by portability into a handheld terminal and a vehicle-mounted terminal. In response to an increasing demand for diversified functions, the terminal has been realized in the form of a multimedia player with multiple functions such as shooting a photographic object as a still image or moving images, reproducing digital audio and video compression files, playing a game, receiving a broadcast or the like.

Furthermore, structural and software modifications to the mobile terminal are considered for supporting and improving functions of the mobile terminal. For instance, a user interface (UI) for a user to search or select functions easily and conveniently is being provided. As a Global Positioning System (GPS) module provided at the mobile terminal has enhanced functions, a current position of the mobile terminal can be checked more accurately. Thus, map information output from the mobile terminal is being much utilized.

SUMMARY OF THE INVENTION

Therefore, an aspect of the detailed description is to provide a mobile terminal capable of providing a graphic user interface (GUI) optimum to output of map information, and a control method thereof.

Another aspect of the detailed description is to provide a mobile terminal capable of providing various map information using a camera, and a control method thereof.

To achieve these and other advantages and in accordance with the purpose of this specification, as embodied and broadly described herein, there is provided a mobile terminal provided with a camera, the mobile terminal including: a display unit configured to output map information; a sensing unit configured to sense a movement of the mobile terminal; and a controller configured to operate the camera, and to output a preview image received through the camera to at least part of a region where the map information has been output, if a movement of the mobile terminal corresponds to a preset type of movement in an output state of the map information, wherein the preview image is overlapped with one or more graphic objects related to the map information.

To achieve these and other advantages and in accordance with the purpose of this specification, as embodied and broadly described herein, there is provided a method of controlling a mobile terminal provided with a camera, the method including: outputting map information; sensing a movement of the mobile terminal; operating the camera and outputting a preview image received through the camera to at least part of a region where the map information has been output, if a movement of the mobile terminal corresponds to a preset type of movement in an output state of the map information; and overlapping graphic objects related to the map information, with the preview image.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate embodiments and together with the description serve to explain the principles of the invention.

In the drawings.

DETAILED DESCRIPTION OF THE INVENTION

Description will now be given in detail according to embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present invention should be construed to extend to any alterations, equivalents and substitutes in addition to those which are particularly set out in the accompanying drawings.

A terminal in the present description may include a mobile terminal such as a portable phone, a smart phone, a notebook computer, a digital broadcasting terminal, Personal Digital Assistants (PDA), Portable Multimedia Player (PMP), a navigation system, a slate PC, a tablet PC, an ultra book, a wearable device (e.g., smart watch), a glass-type terminal (e.g., smart glass), a head mounted display (HMD), etc. However, the present invention may be also applicable to a fixed terminal such as a digital TV, a desktop computer and a digital signage, except for specific configurations for mobility.

Figure 1A:
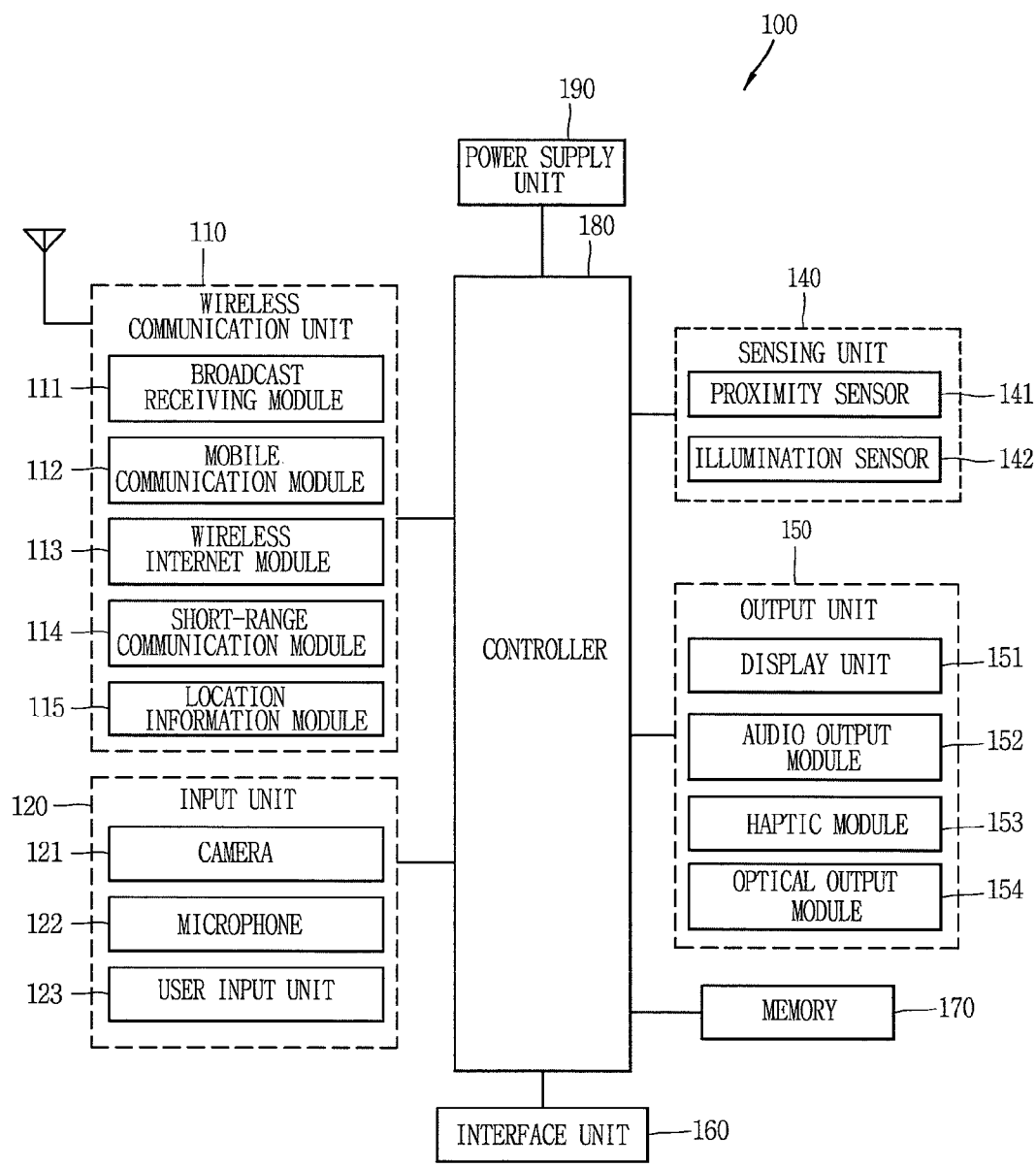
FIG. 1A is a block diagram illustrating a mobile terminal according to an embodiment of the present invention.
Figure 1B:
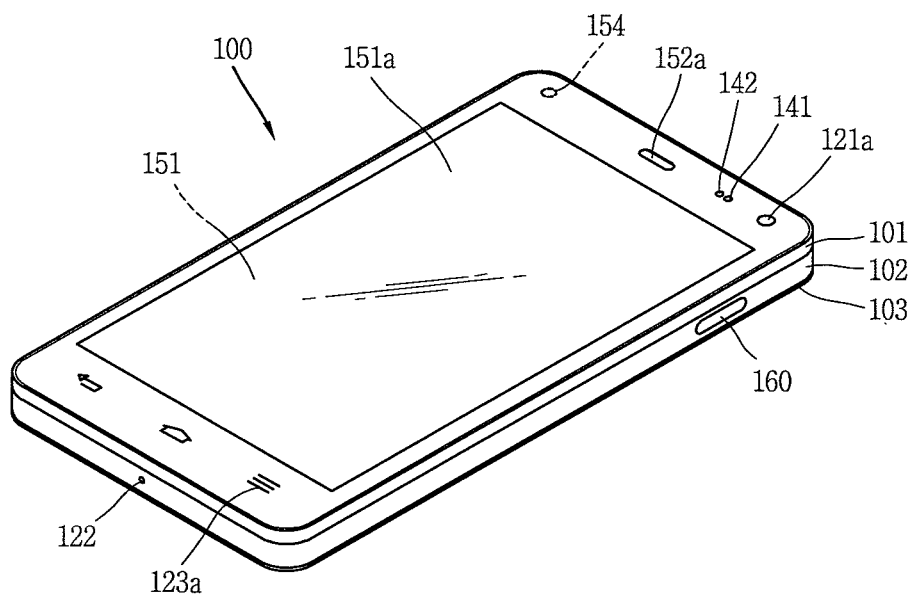
FIGS. 1B and 1C are conceptual views illustrating an example of a mobile terminal according to an embodiment of the present invention, which are viewed from different directions.
Figure 1C:
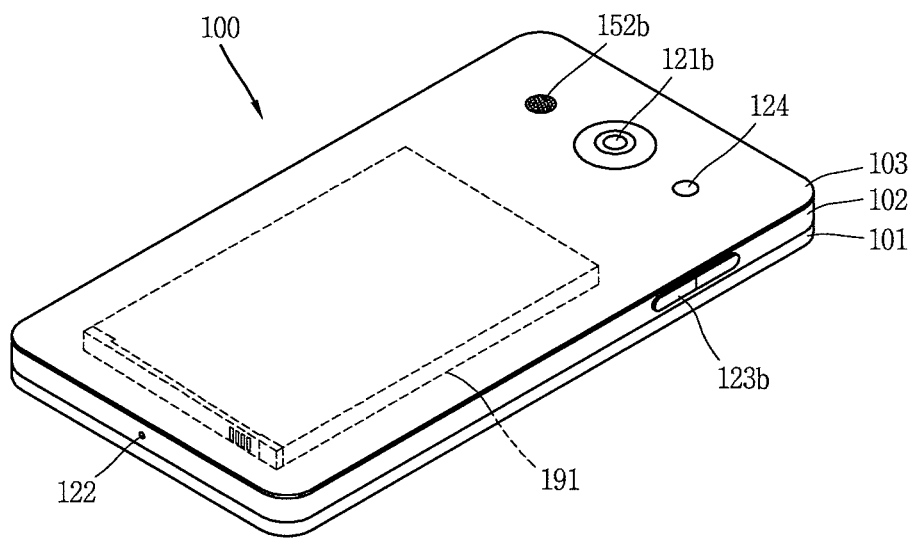

Reference is now made to FIGS. 1A-1C, where FIG. 1A is a block diagram of a mobile terminal according to an embodiment of the present invention, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. Implementing all of the illustrated components of FIG. 1A is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the components may operate in cooperation with one another in order to implement an operation, control or control method of the mobile terminal according to various embodiments to be described below. The operation, control or control method of the mobile terminal may be implemented on the mobile terminal by the execution of at least one application program stored in the memory 170.

Hereinafter, the aforementioned components will be explained in more detail with reference to FIG. 1A, before various embodiments are explained. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to the mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 can measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module can acquire speed information in real time to calculate a current position. Sometimes, accuracy of a measured position may be compromised when the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module. The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like.

In order to remove wireless APs provided using a mobile AP or an illegal MAC address during a location determining process, the Wi-Fi location determination server may extract only a predetermined number of wireless AP information in order of high RSSI. Then, the Wi-Fi location determination server may extract (analyze) location information of the mobile terminal 100 using at least one wireless AP information extracted from the database.

A method for extracting (analyzing) location information of the mobile terminal 100 may include a Cell-ID method, a fingerprint method, a trigonometry method, a landmark method, and the like. The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information can be rapidly acquired. However, in the Cell-ID method, the precision of positioning may fall below a desired threshold when the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals. The landmark method is used to measure a position of a mobile terminal using a known landmark transmitter.

In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 can acquire location information by being connected to at least one wireless AP. The number of wireless APs required to acquire location information of the mobile terminal 100 may be variously changed according to a wireless communication environment within which the mobile terminal 100 is positioned.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan a movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The display unit 151, the first audio output module 152a, the second audio output module 152b, the proximity sensor 141, the illumination sensor 142, the optical output module 154, a first camera 121a, a second camera 121b, the first manipulation unit 123a, the second manipulation unit 123b, the microphone 122, the interface 160, etc. may be provided at the mobile terminal 100.

As shown in FIGS. 1B and 1C, the display unit 151, the first audio output module 152a, the proximity sensor 141, the illumination sensor 142, the optical output module 154, the first camera 121a and the first manipulation unit 123a are arranged on a front surface of the terminal body. The second manipulation unit 123b, the microphone 122 and the interface 160 are arranged on side surfaces of the terminal body. And the second audio output module 152b and the second camera 121b are arranged on a rear surface of the terminal body.

However, alternative arrangements are possible and within the teachings of the instant invention. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable mobile terminals. Examples of such suitable mobile terminals include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two mobile terminals, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a receiver, and the second audio output module 152b may be implemented in the form of a loud speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may be implemented in a user's non-tactile manner, e.g., by a proximity touch, a hovering touch, etc.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen. As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject. As shown in FIG. 1C, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (refer to FIG. 1A) may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The mobile terminal, which can include at least one of the above components, may output map information 200 (see FIG. 3) to the display unit 151. The map information 200 may be output based on selection of an icon related to output of map information (or an icon of an application). For instance, the map information 200 may be output to the display unit 151 based on selection of an icon of a map-related application (e.g., a map function application, a road search function application, a traffic-related function application, etc.). When the map information 200 is output through the icon, the display unit 151 may be an 'ON' state.

The map information 200 may be stored in the memory. When a map-related application is executed, the controller 180 can output the map information 200 stored in the memory to the display unit 151. The map information 200 may be received from an external server (or an external device). More specifically, when a map-related application is executed, the controller 180 can receive the map information 200 from an external server, and may output the received map information 200 to the display unit 151.

In the present invention, various information may be output to the map information. The various information include all types of information related to map information. For instance, the various information may include position information of the mobile terminal, route information, traffic information, geography information, actual image information, etc.

Figure 3A:
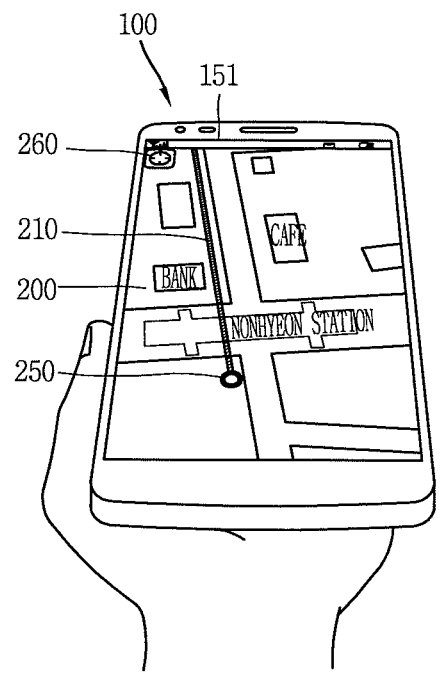
FIGS. 3(a) to 3(b) are conceptual views illustrating the control method of FIG. 2.

For instance, referring to FIG. 3(a), an icon 260 for activating a GPS module may be output to the map information 200 output to the display unit 151. Upon selection of the icon 260, the controller 180 can acquire position information of the mobile terminal 100. Then, the controller 180 can output an icon 250 for guiding a position of the mobile terminal 100, to the map information 200, based on the acquired position information.

As another example, when destination information is input based on a user's request, the controller 180 can output route information 210 from a current position of the mobile terminal to an input destination, to the map information 200. Alternatively, when starting point information and destination information are input based on a user's request, the controller 180 can output route information 210 from a input starting point to an input destination, to the map information 200.

With such a configuration, a user can check his or her position where the mobile terminal is positioned, based on map information. And the user can perform a navigation function using position information and route information displayed on the map information.

Figure 2:
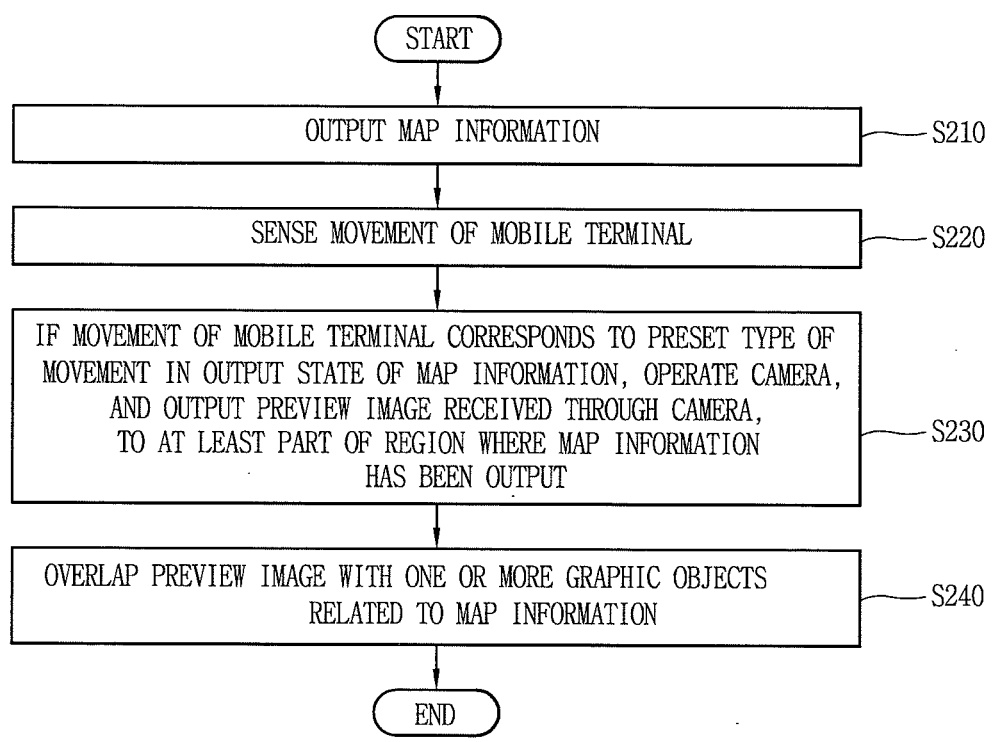
FIG. 2 is a flowchart illustrating a method of controlling a mobile terminal according to an embodiment of the present invention.

Hereinafter, a method of providing a graphic user interface (GUI) optimum to output of map information according to an embodiment of the present invention, will be explained in more detail with reference to the attached drawings. In particular, FIG. 2 is a flowchart illustrating a method of controlling a mobile terminal according to an embodiment of the present invention, and FIG. 3 is a conceptual view illustrating the control method of FIG. 2.

Firstly, map information 200 is output to the display unit 151 (S210). More specifically, the map information 200 may be output based on selection (or touch) of an icon related to output of map information (or an icon of an application). The map information 200 may include position information and route information. Hereinafter, the map information 200 will be explained for convenience. Explanations about the map information 200 may be equally (similarly) applied to explanations about the position information and the route information.

Next, a movement of the mobile terminal 100 is sensed (S220). More specifically, the sensing unit 140 may sense a movement of the mobile terminal 100. The controller 180 can activate the sensing unit 140 to sense a movement of the mobile terminal 100, when the map information 200 has been output to the display unit 151.

The movement of the mobile terminal 100 may mean conversion of the mobile terminal 100 from a first state to a second state. For instance, the movement of the mobile terminal may mean a state conversion of the mobile terminal from a stationary state to a moving state. Alternatively, the movement of the mobile terminal may mean a posture change of the mobile terminal from a first posture to a second posture. Alternatively, the movement of the mobile terminal may mean a speed change from a moving state with a first speed, to a moving state with a second speed.

Next, if a movement of the mobile terminal corresponds to a preset type of movement when the map information 200 has been output to the display unit 151, the camera 121 is operated. Further, a preview image 300, received through the camera 121, is output to at least part of a region where the map information 200 has been output (S230).

More specifically, the controller 180 can sense a movement of the mobile terminal 100 in an output state of the map information 200. The controller 180 can activate the sensing unit 140 based on output of the map information 200, such that a movement of the mobile terminal 100 is sensed in an output state of the map information 200.

If a movement of the mobile terminal 100 sensed in an output state of the map information 200 corresponds to a preset type of movement, the controller 180 can operate the camera 121. The preset type of movement may be a movement preset to operate the camera 121. That is, if a movement of the mobile terminal 100 sensed in an output state of the map information 200 corresponds to a preset type of movement, the controller 180 can operate the camera 121, and output a preview image 300 received through the camera 121 to at least part of the map information 200.

Figure 4A:
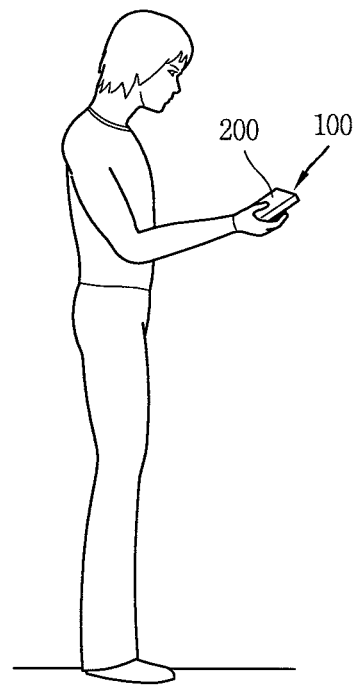
FIGS. 4A(a) to 4C(b) are conceptual views each illustrating a preset type of movement for outputting a preview image according to an embodiment of the present invention.
Figure 4A:
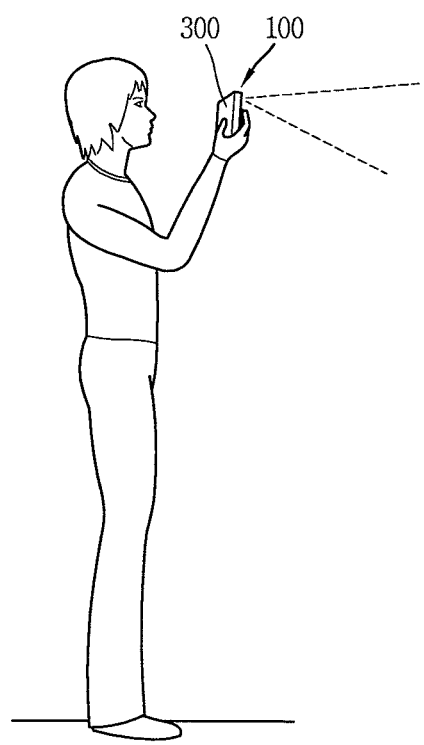
Figure 4B:
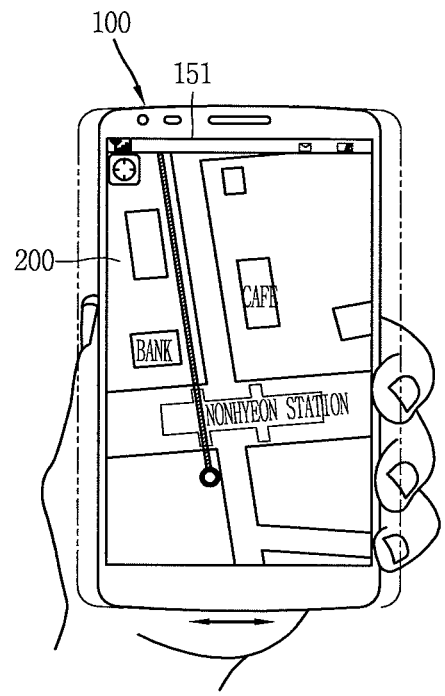
Figure 4B:
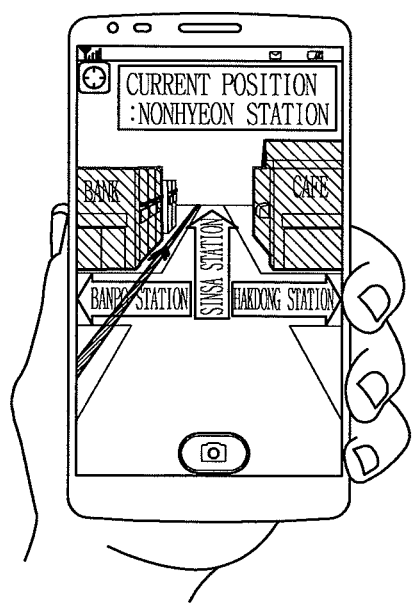
Figure 4C:
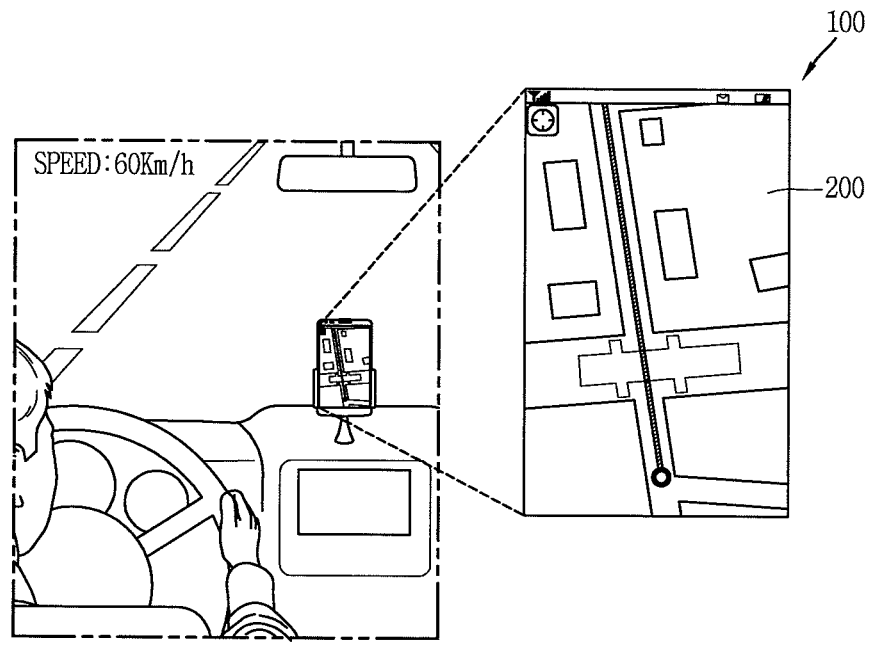
Figure 4C:
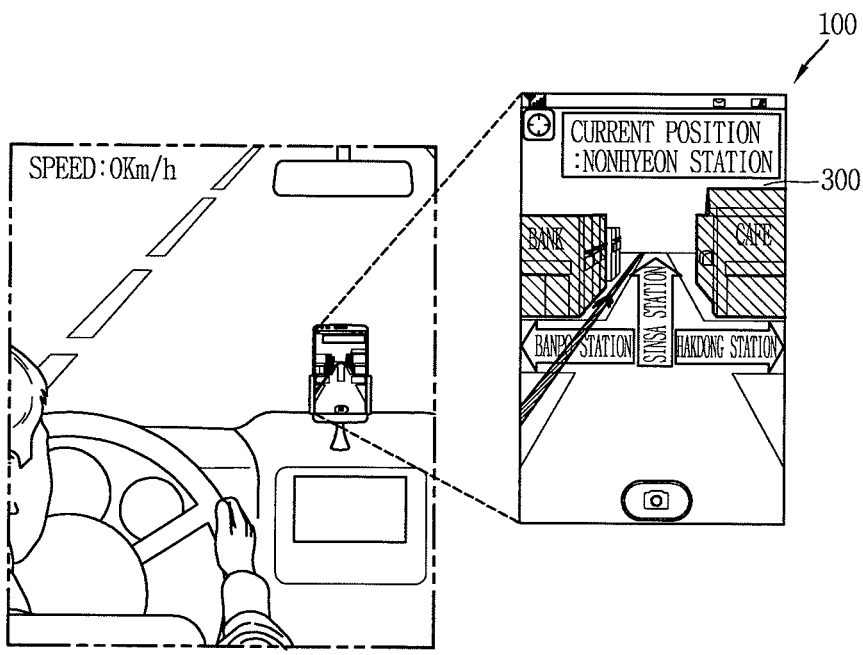

The preset type of movement will be explained in more detail with reference to FIGS. 4A to 4C. Next, one or more graphic objects related to the map information 200 are overlapped with the preview image 300 (S240). More specifically, graphic objects 220 and 230 related to the map information 200 may be overlapped with the output preview image 300. The step (S230) of outputting a preview image, and the step (S240) of overlapping graphic objects related to map information with the output preview image may be performed sequentially or simultaneously. That is, in S230, if a movement of the mobile terminal 100 sensed in an output state of the map information 200 corresponds to a preset type of movement, the controller 180 can operate the camera 121, and output the preview image 300 with which one or more graphic objects related to the map information have been overlapped.

The preview image 300 may include an image(s) corresponding to at least one subject. More specifically, when the camera 121 is operated, one or more subjects to be captured may exist in a direction of the camera. That is, when the camera 121 faces one or more subjects, the controller 180 can acquire the preview image 300 including an image(s) corresponding to the one or more subjects that which the camera 121 faces.

The graphic objects 220 and 230 related to the map information 200 may be output to images corresponding to the subjects, or around the images. The graphic objects 220 and 230 related to the map information 200, overlapped with the preview image 300, may be graphic objects related to information provided from the map information 200. More specifically, the graphic objects 220 and 230 related to the map information 200 may serve to output information provided from the map information 200, in a connected manner with the preview image 300. That is, the controller 180 can overlap the graphic objects 220 and 230 related to the map information 200 with the preview image 300, such that information provided from the map information 200 is recognizable through the preview image 300.

For instance, when information on a specific place is included in the map information 200, if one of images included in the preview image 300 corresponds to the specific place, the controller 180 can overlap the graphic object 220 for guiding the specific place, with the image corresponding to the specific place.

One or more graphic objects related to the map information may be implemented in various manners. For instance, when route information 210 is output (set) to the map information 200, the graphic object 230 related to the route information 210 may be overlapped with the preview image 300. That is, if a movement of the mobile terminal corresponds to a preset type of movement, when the route information 210 has been set to the map information 200, the controller 180 can output the preview image 300. Then, the controller 180 can output the graphic object 230 for guiding the route information 210, to the preview image 300.

The graphic object 230 related to the route information corresponds to one embodiment of the graphic object 220 related to the map information, which is differentiated from the graphic object 220 related to the map information for convenience. That is, the explanations about the graphic object 220 related to the map information may be applied to explanations about the graphic object 230 related to the route information, and vice versa.

As another example, the controller 180 can output the graphic object 220 for guiding position information 250 of the mobile terminal 100, which is included in the map information, to the preview image 300. As another example, the preview image 300 may include an image corresponding to a road. In this instance, the controller 180 can output the graphic object 220 to the image corresponding to the road, the graphic object 220 corresponding to at least one of a name related to the road (e.g., a building name), and a preset name (representative name) of the road.

The controller 180 can output the graphic objects 220 and 230 related to map information, to an image corresponding to a subject included in the preview image 300, or around the image. More specifically, the controller 180 can extract an image(s) corresponding to at least one subject, included in the preview image 300, by analyzing the preview image 300 received through the camera 121. A method of extracting a specific part from a preview image will not be explained, since it corresponds to a general technique.

The controller 180 can overlap the graphic object 230 related to the map information, with the preview image 300, using at least one of the extracted image and position information of the mobile terminal 100. For instance, the controller 180 can determine a region on the map information 200, to which an image extracted from the preview image 300 corresponds, using at least one of information stored in a database of an external server, and information stored in the memory.

Further, the controller 180 can determine a region on the map information 200, to which an image extracted from the preview image 300 corresponds, using position information of the mobile terminal acquired by a GPS module. More specifically, the controller 180 can determine a region on the map information 200, to which the preview image 300 received through the camera based on position information of the mobile terminal corresponds, and may determine a region on the map information 200, to which an image extracted from the preview image 300 corresponds.

Then, the controller 180 can output the graphic objects 220 and 230 related to the map information, to an image(s) corresponding to at least one subject included in the preview image 300, based on the determination result. The graphic objects 220 and 230 indicate that information on the subject exists.

The above explanations will be well understood with reference to FIG. 3. As shown in FIG. 3(a), map information 200 may be output to the display unit 151. The mobile terminal 100 may move in an output state of the map information 200. The sensing unit 140 may sense a movement of the mobile terminal 100.

If a movement of the mobile terminal corresponds to a preset type of movement, when the map information 200 has been output, the controller 180 can operate the camera, and may output the preview image 300 to at least part of a region where the map information 200 has been output. For instance, if a movement of the mobile terminal 100 corresponds to a preset type of movement, the controller 180 can convert the map information 200 output to the display unit 151, to the preview image 300.

Figure 3B:
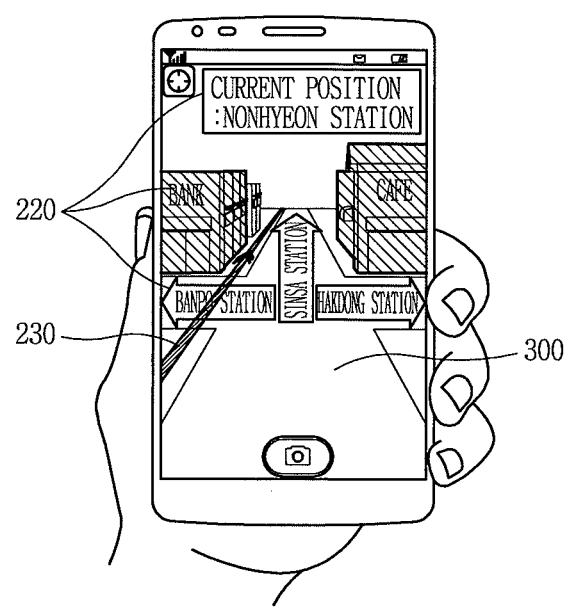

As another example, if a movement of the mobile terminal 100 corresponds to a preset type of movement, the controller 180 can output the preview image 300 to at least part of a region where the map information 200 has been output. As shown in FIGS. 3(a) and 3(b), the preset type of movement may correspond to conversion of the mobile terminal from a first posture (e.g., a laid-down state), to a second posture different from the first posture (e.g., a stand-up state).

The graphic objects 220 and 230 related to the map information may be overlapped with the preview image 300. More specifically, the preview image 300 may include an image (s) corresponding to at least one subject. The controller 180 can overlap the graphic objects 220 and 230 related to the map information, with the images corresponding to the subjects, or around the images.

Types of the graphic objects 220 and 230 related to the map information may be variable according to a type of an image corresponding to a subject included in the preview image. For instance, as shown in FIG. 3(b), a business name such as a building name, and a graphic object for recognizing a building may be output to an image corresponding to a building. To an image corresponding to a road, route information, a name related to the road (e.g., building name), and a graphic object for recognizing a representative name of the road may be output.

As another example, if an image corresponding to a subject is unrelated to specific information (e.g., the sky), various information related to the map information (e.g., a current position of the mobile terminal) may be displayed on the image corresponding to the subject.

As aforementioned, in the present invention, if a movement of the mobile terminal corresponds to a preset type of movement in an output state of map information, a preview image, with which one or more graphic objects related to the map information have been overlapped, may be output. With such a configuration, a user can be provided with map information through a preview image, and thus can be provided with his or her desired information in a more realistic and intuitive manner.

Hereinafter, a preset type of movement for outputting a preview image in an output state of map information will be explained in more detail with reference to the attached drawings. FIGS. 4A to 4C are conceptual views each illustrating a preset type of movement for outputting a preview image according to an embodiment of the present invention.

If a movement of the mobile terminal corresponds to a preset type of movement, the controller 180 can operate the camera 121, and may output a preview image 300 to the display unit 151. More specifically, if a movement of the mobile terminal 100 corresponds to a preset type of movement, when map information 200 has been output to the display unit 151, the controller 180 can output a preview image 300 to at least part of a region where the map information 200 has been output.

The preset type of movement may be conversion of the mobile terminal from a first state to a second state. For instance, as shown in FIG. 4A(a), the map information 200 may be output to the display unit 151 when the mobile terminal 100 is in a laid-down state at an angle less than a preset angle based on a ground surface. The controller 180 can sense a movement of the mobile terminal, when the map information 200 has been output to the display unit 151. As shown in FIG. 4A(b), upon sensing of a movement of the mobile terminal 100 from a laid-down state at an angle less than a preset angle based on a ground surface, to a stand-up state at an angle more than the preset angle, the controller 180 can operate the camera, and may output the preview image 300 received through the camera, to the display unit 151.

Further, the preset type of movement may be a movement of the mobile terminal which vibrate within a preset time with a preset frequency (number of times). For instance, as shown in FIG. 4B(a), when the map information 200 has been output to the display unit 151, the mobile terminal 100 may vibrate by an external force (or a user), within a preset time with a preset frequency (number of times). In this instance, as shown in FIG. 4B(b), the controller 180 can output the preview image 300 overlapped with one or more graphic objects related to the map information, to the display unit 151.

The preset type of movement may be a speed change of the mobile terminal, from a first speed to a second speed. For instance, as shown in FIG. 4C(a), the mobile terminal 100 may have a speed change from a first speed (e.g., 60 km/h), to a second speed (e.g., 0 km/h). In this instance, as shown in FIG. 4C(b), the controller 180 can output, to the display unit 151, the preview image 300 overlapped with one or more graphic objects related to the map information.

In addition, the controller 180 can operate the camera 121 based on position information of the mobile terminal 100, and may output a preview image 300 received through the camera to the display unit 151. For instance, if it is determined that the mobile terminal 100 is disposed at a crossroad, in an output state of the map information 200, the controller 180 can operate the camera 121, and may output the preview image 300 received through the camera 121 to at least part of a region where the map information 200 has been output.

In addition, an icon for operating the camera 121 may be output to the map information 200. The controller 180 can operate the camera based on selection of the icon, and may output the preview image 300 received through the camera 121 to at least part of a region where the map information 200 has been output.

As aforementioned, in the present invention, if a movement of the mobile terminal 100 corresponds to a preset type of movement, when map information 200 has been output to the display unit 151, the controller 180 can output a preview image, and may overlap one or more graphic objects related to the map information 200 with the preview image. As a result, a user can be provided with a preview image overlapped with one or more graphic objects related to the map information, without an additional preview image output request.

Hereinafter, a method of controlling map information, and map information-related graphic object(s) overlapped with a preview image will be explained in more detail with reference to the attached drawings. FIGS. 5A to 5E are conceptual views illustrating a method of controlling map information and a preview image according to an embodiment of the present invention.

Figure 5A:
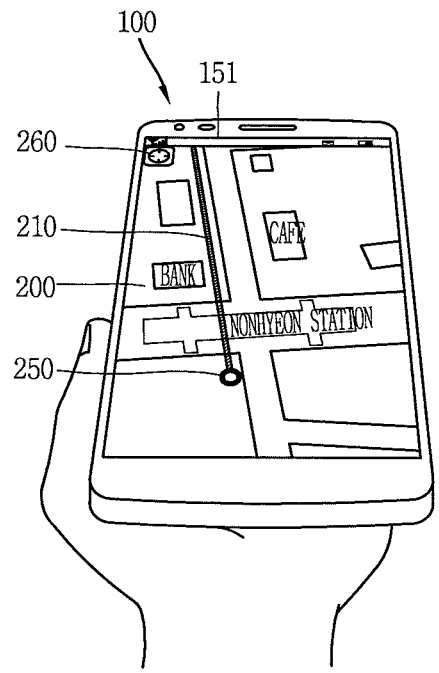
FIGS. 5A(a) to 5E(c) are conceptual views illustrating a method of controlling map information and a preview image according to an embodiment of the present invention.
Figure 5A:
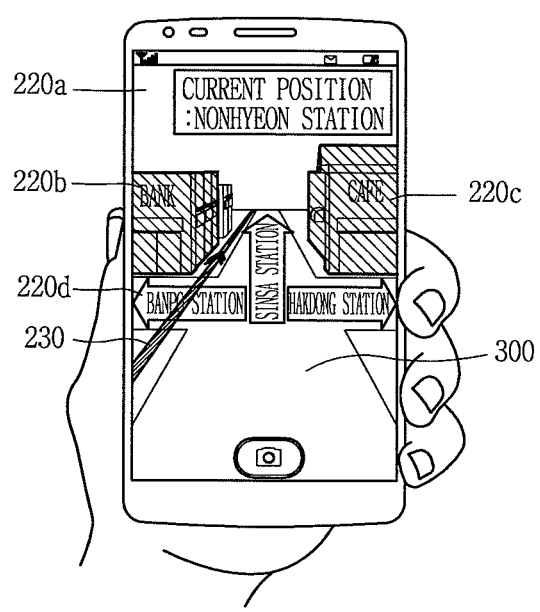
Figure 5A:
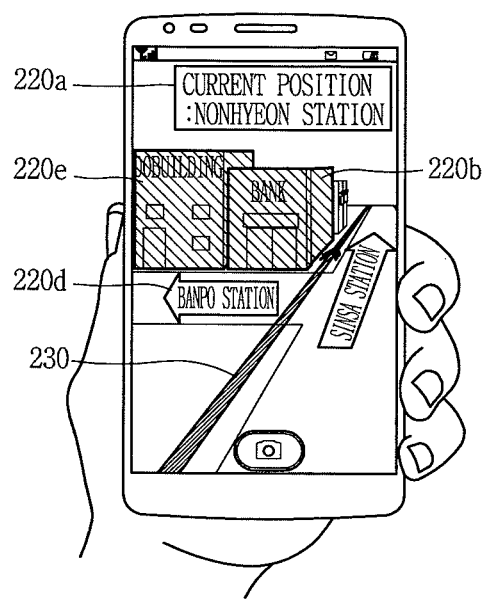
Figure 5A:
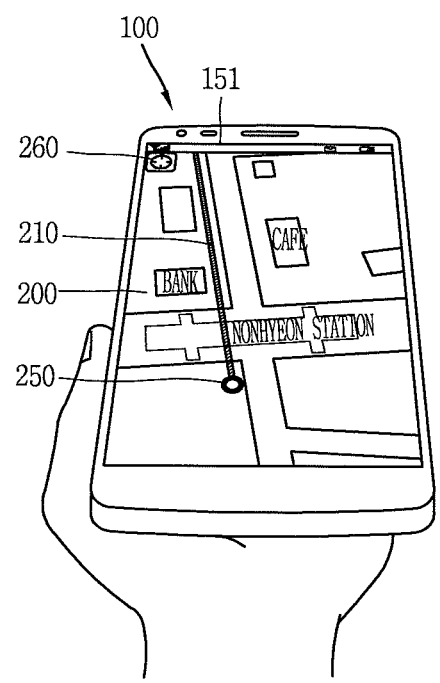

As shown in FIG. 5A(a), map information 200 may be output to the display unit 151. If the mobile terminal 100 is moved from a laid-down state at an angle less than a preset angle based on a ground surface, to a stand-up state at an angle more than the preset angle, the controller 180 can operate the camera. Then, as shown in FIG. 5A(b), the controller 180 can output a preview image 300 received through the camera, to at least part of a region where the map information 200 has been output. Graphic objects 220 and 230 related to the map information may be overlapped with the preview image 300.

The preview image 300 may include an image(s) corresponding to at least one subject. The graphic objects 220 and 230 related to the map information, may be output to the images corresponding to the subjects, or around the images.

Types of the graphic objects 220 and 230 related to the map information may be variable according to a type of the image corresponding to a subject. More specifically, the controller 180 can output a different graphic object according to a type of an image included in the preview image 300 (a type of a subject).

For instance, as shown in FIG. 5A(b), an image corresponding to a subject, which is included in the preview image 300, may be overlapped with a map information-related graphic object corresponding to the subject. If an image corresponding to a subject is a building (e.g., bank), an image corresponding to the building, included in the preview image 300, may be overlapped with the graphic object 220 for recognizing the building.

If an image corresponding to a subject is a road, an image corresponding to the road included in the preview image 300 may be overlapped with a graphic object 220d related to road information (e.g., route information, a name related to the road, a representative name of the road, etc.).

An output position of the graphic object(s) related to the map information may be changed according to a movement of an image(s) corresponding to at least one subject included in the preview image 300. For instance, as shown in FIGS.

5A(b) and (c), if the mobile terminal is moved by a user, a direction that the camera faces may become different. As a result, the preview image 300 received through the camera may become different. That is, an image corresponding to a subject included in the preview image 300 may be moved.

If an image corresponding to a subject, included in the preview image 300, is moved, the controller 180 can change an output position of a graphic object 220b related to the map information, in correspondence to the moved image. That is, the graphic object 220b related to the map information may be moved in correspondence to a movement of an image included in the preview image 300.

If an image corresponding to a new subject is output to the preview image 300 as the mobile terminal 100 moves, the controller 180 can output a graphic object 220e related to the map information, to the image corresponding to a new subject, or around the image, as shown in FIG. 5A(c). If one of images corresponding to subjects, included in the preview image 300, disappears as the mobile terminal moves, the controller 180 can restrict output of a map information-related graphic object 220c overlapped with the image.

Then, if a movement of the mobile terminal corresponds to a preset type of movement (e.g., if the mobile terminal is converted (restored) to a first state from a second state), the controller 180 can restrict output of the preview image 300 as shown in FIG. 5A(d).

Figure 5B:
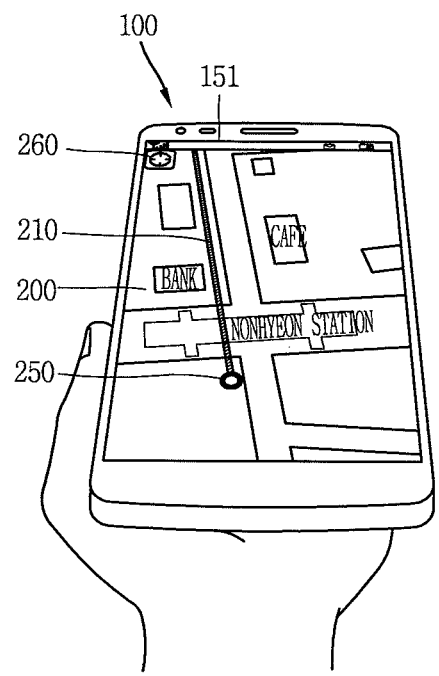
Figure 5B:
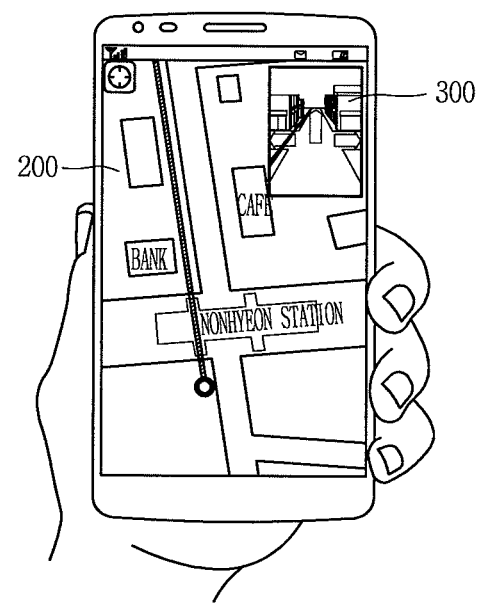

As shown in FIG. 5B(a), if a movement of the mobile terminal 100 corresponds to a preset type of movement when map information 200 has been output to the display unit 151, the controller 180 can operate the camera 121. Then, as shown in FIG. 5B(b), the controller 180 can output a preview image 300 received through the camera 121, to part of a region where the map information 200 has been output. That is, the controller 180 can output both of the map information 200 and the preview image 300, to the display unit 151. The preview image 300 may be overlapped with a graphic object related to the map information.

An output position of the preview image 300 may become variable according to a direction that the camera 121 faces. The controller 180 can determine a direction that the camera 121 faces, using at least one of the map information 200, position information received through a GPS module, the preview image 300, and the sensing unit 140.

For instance, the controller 180 can determine a direction that the camera 121 faces, using at least one of position information received through a GPS module, and posture information of the mobile terminal 100 sensed by the sensing unit 140. As another example, the controller 180 can determine a direction that the camera 121 faces, by analyzing an image output to the preview image 300.

Figure 5C:
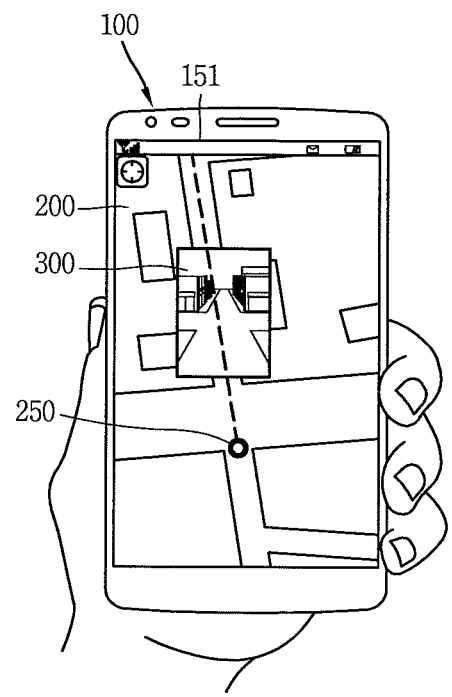
Figure 5C:
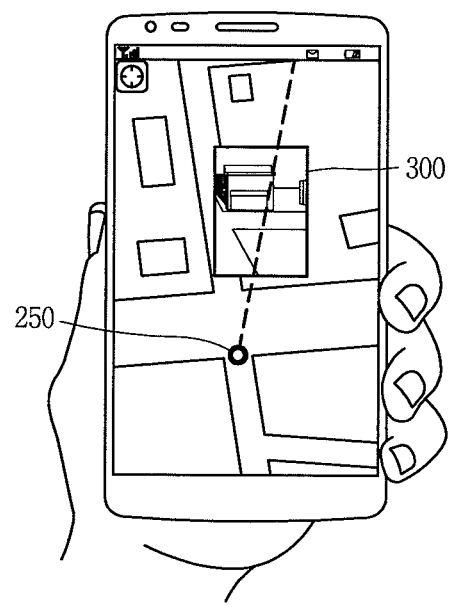

As shown in FIGS. 5C(a) and (b), the controller 180 can determine part of a region where the map information 200 has been output, as an output position of the preview image 300, based on a direction that the camera faces. For instance, the preview image 300 may be output in correspondence to a direction that the camera 121 faces, around position information 250 included in the map information 200.

The controller 180 can output an indicator 270 for guiding a direction that the camera 121 faces, to the map information 200. For instance, as shown in FIGS. 5D(a) and (b), the controller 180 can output an indicator 270 for guiding a direction that the camera 121 faces, to the position information 250 included in the map information 200.

Figure 5D:
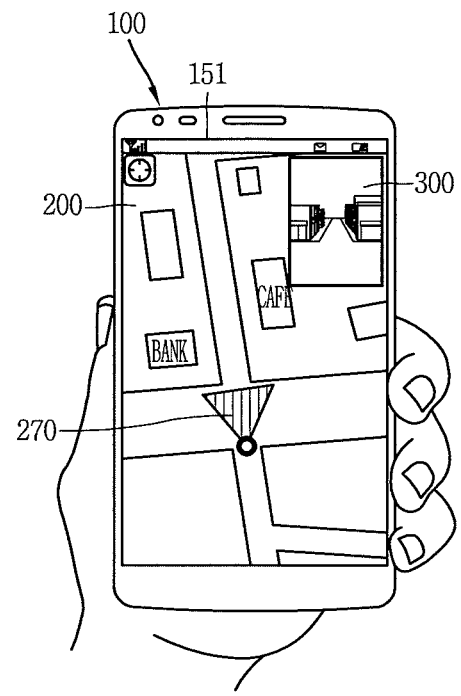
Figure 5D:
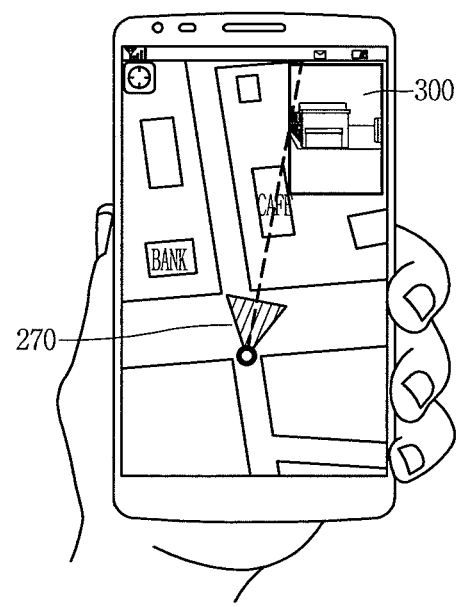

Further, as aforementioned with reference to FIGS. 5C and 5D, the controller 180 can output the preview image 300 on part of a region where the map information 200 has been output, in correspondence to a direction that the camera faces. And the controller 180 can display the indicator 270 for guiding a direction that the camera 121 faces.

In the present invention, once map information and a preview image are provided, the preview image is output in correspondence to a direction that the camera faces, or an indicator for guiding a direction that the camera 121 faces is output. With such a configuration, map information can be provided in a more intuitive manner.

Figure 5E:
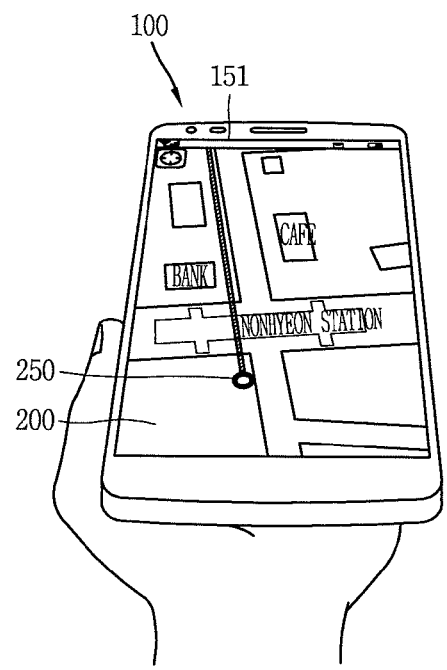
Figure 5E:
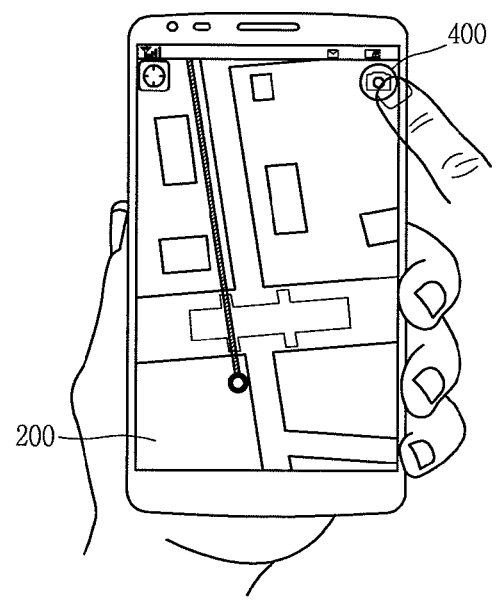
Figure 5E:
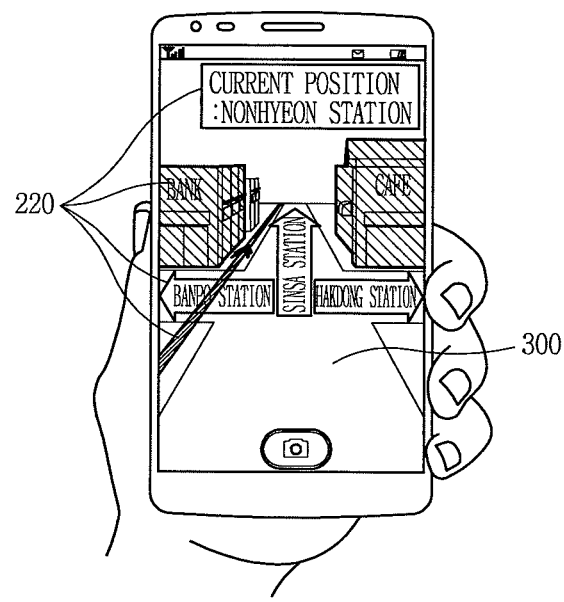

If a movement of the mobile terminal 100 corresponds to a preset type of movement, when map information 200 has been output to the display unit 151 as shown in FIG. 5E(a), the controller 180 can output an icon 400 related to a preview image output function, to the map information 200, as shown in FIG. 5E(b). That is, the icon 400 related to a preview image output function may be an icon related to a camera driving function.

Upon selection of the icon 400 related to a preview image output function and output to the map information 200 as shown in FIG. 5E(b), the controller 180 can output the preview image 300, and may overlap one or more graphic objects related to the map information with the preview image 300, as shown in FIG. 5E(c). Further, the icon 400 related to a camera driving function may be output not only when a movement of the mobile terminal corresponds to a preset type of movement, but also when the map information 200 is output.

As aforementioned, in the present invention, if a movement of the mobile terminal corresponds to a preset type of movement in an output state of map information, a preview image overlapped with a graphic object related to the map information can be output. As a result, a user's difficulty in alternately viewing the mobile terminal where map information has been output, and a realistic space in order to acquire his or her desired information, can be solved.

Figure 6A:
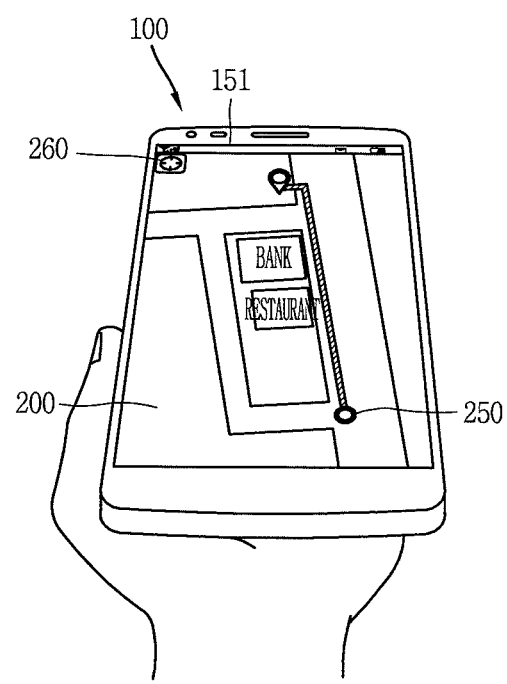
FIGS. 6A(a) to 6A(c) and 6B(a) to 6B(b) are conceptual views illustrating a method of controlling map information using a preview image.
Figure 6A:
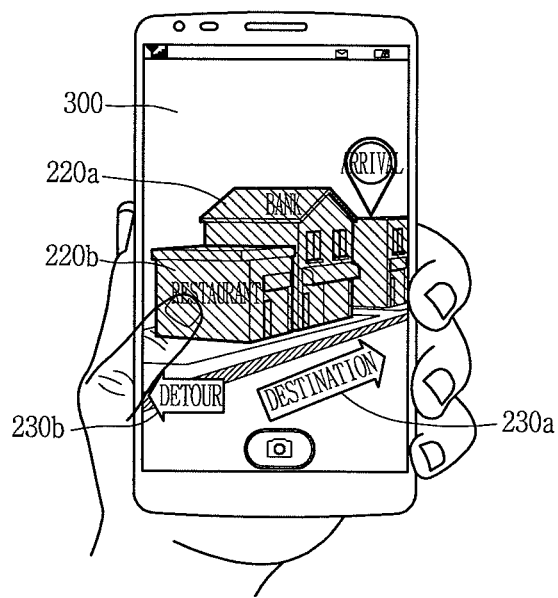
Figure 6A:
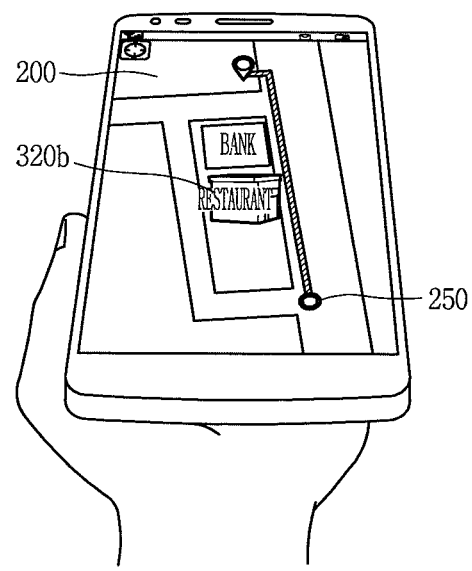
Figure 6B:
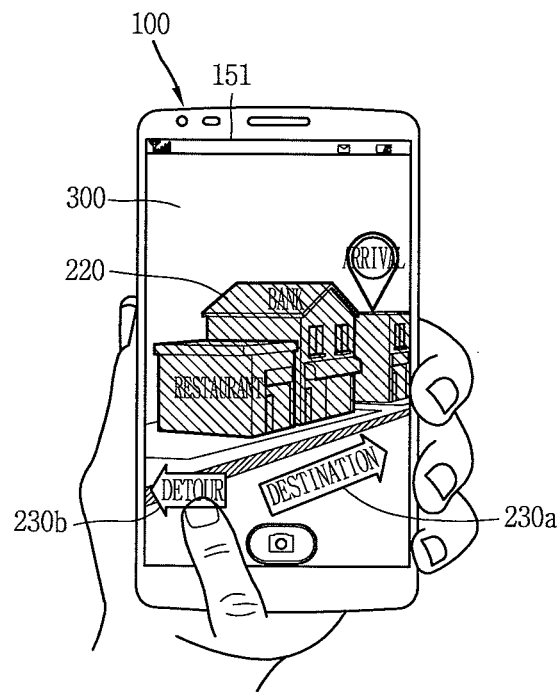
Figure 6B:
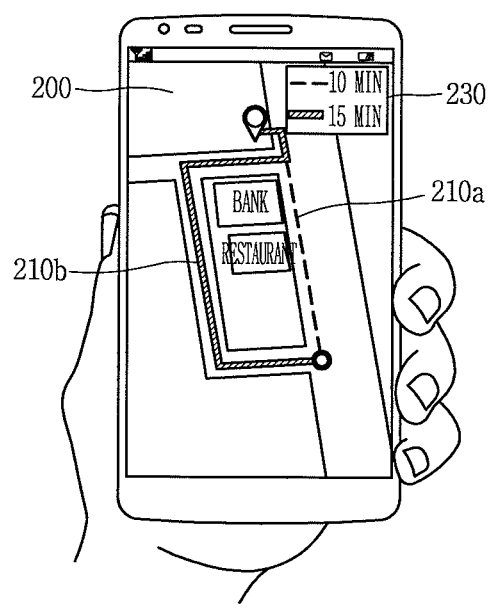

Hereinafter, a method of controlling map information using a preview image according to an embodiment of the present invention will be explained in more detail with reference to the attached drawings. FIGS. 6A and 6B are conceptual views illustrating a method of controlling map information using a preview image.

As shown in FIG. 6A(a), the controller 180 can sense a movement of the mobile terminal, when map information 200 has been output to the display unit 151. If a movement of the mobile terminal 100 corresponds to a preset type of movement, the controller 180 can output a preview image 300 received through the camera, to part of a region where the map information 200 has been output.

Graphic objects 220a, 220b, 230a and 230b related to the map information 200 may be output to the preview image 300. Upon receipt of a request for capturing the preview image 300, the controller 180 can capture the preview image 300. In this instance, the controller 180 can capture the preview image overlapped with the graphic objects related to the map information, or may capture the preview image excluding the graphic objects.

If one of the graphic objects related to the map information is selected, the controller 180 can capture an image corresponding to the selected graphic object. For instance, as shown in FIG. 6A(b), if one 220b of the graphic objects 220a, 220b, 230a and 230b overlapped with the preview image is selected, the controller 180 can capture an image corresponding to the selected graphic object 220b. The capturing of the image corresponding to the selected graphic object 220b may be performed by capturing only the image from the preview image 300, or by extracting the image after entirely capturing the preview image 300.

As shown in FIG. 6A(c), if one of the graphic objects 220a, 220b, 230a and 230b related to the map information is selected, the controller 180 can capture an image 320b corresponding to the selected graphic object, and then may restrict output of the preview image 300. Alternatively, the controller 180 can output the captured image 320b to the map information 200.

The captured image 320b may be output to a point on the map information 200, the point where a subject corresponding to the captured image 320b is positioned. For instance, as shown in FIGS. 6A(b) and (c), if the graphic object 220b related to a building (e.g., a restaurant) is selected, the controller 180 can capture an image corresponding to the graphic object (e.g., an image corresponding to the building). Then, as shown in FIG. 6A(c), the controller 180 can restrict output of the preview image 300, and may output the captured image 320b to a point on the map information 200, the point where a subject (a restaurant) corresponding to the captured image 320b is positioned.

Outputting the captured image 320b to the map information 200 may mean updating the map information 200. With such a configuration, a user can be provided with the map information 200 in a more intuitive manner, since the captured image 320b is output to the map information 200 provided in the form of a simple image.

In another embodiment, if one of the graphic objects 220a, 220b, 230a and 230b output to the preview image 300 is selected, the controller 180 can output detailed information on the selected graphic object. The controller 180 can output detailed information on the selected graphic object to the preview image 300, when output of the preview image 300 is maintained. Alternatively, the controller 180 can output detailed information on the selected graphic object to the map information 200, when output of the preview image 300 is restricted. If detailed information on the selected graphic object is output to the map information 200, the detailed information may be output to a point on the map information or around the point, the point where a subject with respect to an image corresponding to the selected graphic object is positioned.

The detailed information means minute information provided from map information. For instance, when a selected graphic object corresponds to a graphic object overlapped with an image corresponding to a building, the detailed information may be information on a building name, a building address, stores (offices) included in a building, etc. Further, when a selected graphic object corresponds to a graphic object overlapped with an image corresponding to a road, the detailed information may be route information, or information on a name output to the selected graphic object (e.g., road name, preset representative name, etc.).

As shown in FIG. 6A(a), route information 210 may be set to the map information 200 according to a user's request. In this instance, graphic objects 230a and 230b related to route information may be output to a preview image 300. The graphic objects related to the route information are graphic objects related to the map information, which may be understood as a concept included in the graphic objects related to the map information.

The controller 180 can output first route information 210a to the map information 200 according to a user's request. When the preview image 300 is output based on a movement of the mobile terminal, the controller 180 can output a graphic object 230a related to the first route information 210a, to the preview image 300.

The graphic object 230a related to the first route information 210a may be overlapped with an image corresponding to a road, among images corresponding subjects, the images included in the preview image 300. Alternatively, the graphic object 230a related to the first route information 210a may be overlapped around the image corresponding to the road.

If the preview image is output, when the mobile terminal 100 is positioned at a crossroad on the map information, the controller 180 can further output a graphic object 230b related to second route information different from the first route information. For instance, as shown in FIG. 6B(a), if the preview image 300 is output, when the mobile terminal 100 is positioned at a crossroad on the map information, the controller 180 can output a graphic object 230a related to first route information, and a graphic object 230b related to second route information different from the first route information.

If one of graphic objects output to the preview image 300 is selected, the controller 180 can restrict output of the preview image 300. When the graphic object 230a related to the first route information is selected among graphic objects output to the preview image 300, the controller 180 can output detailed information on the first route information, to the map information 200.

In another embodiment, when the graphic object 230a related to the first route information is selected from the preview image 300, the controller 180 can zoom-in the preview image 300, when output of the preview image 300 is maintained. When the graphic object 230b related to the second route information is selected among graphic objects output to the preview image 300 as shown in FIG. 6B(a), the controller 180 can change the first route information 210a output to the map information 200, to the second route information 210b different from the first route information 210a, as shown in FIG. 6B(b).

Detailed information 240 on the first route information 210a and the second route information 210b may be output to the map information 200. For instance, the detailed information 240 may be information on time required with respect to the first and second route information.

With such a configuration, the controller may control map information by using a preview image. More specifically, map information may be updated such that one or more images included in a preview image are output to the map information, or route information set to the map information may be changed into other route information. Thus, a user can use map information in a more intuitive manner, and can change route information more conveniently. Further, the user can be provided with a user interface for easily selecting his or her desired path by comparing current route information with previous route information.

Figure 7A:
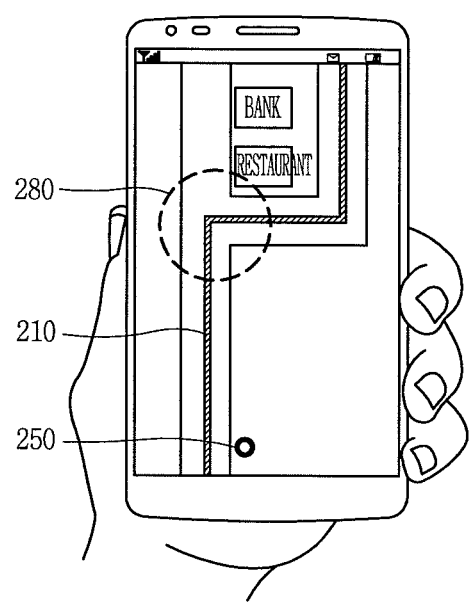
FIGS. 7A(a) to 7A(c) and 7B(a) to 7B(b) are conceptual views illustrating a method of outputting a preview image according to another embodiment of the present invention.
Figure 7A:
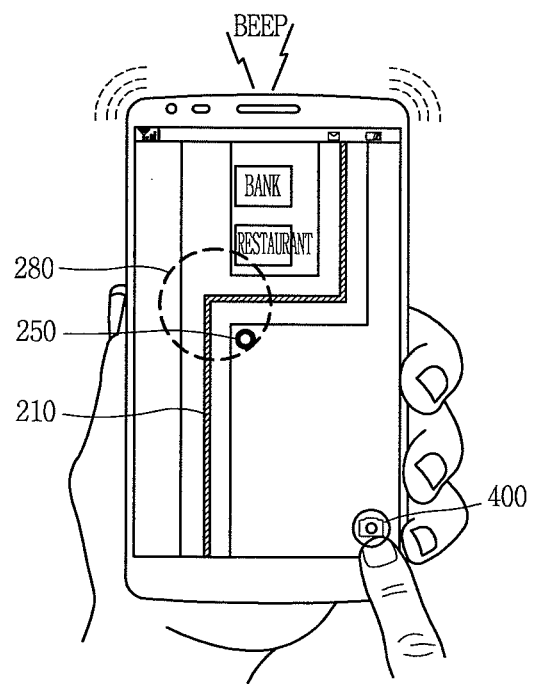
Figure 7A:
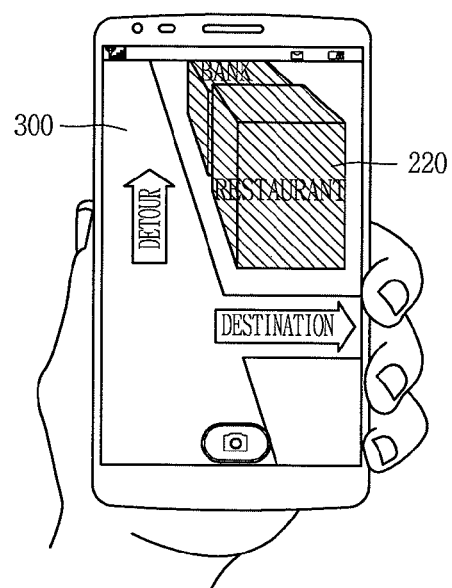
Figure 7B:
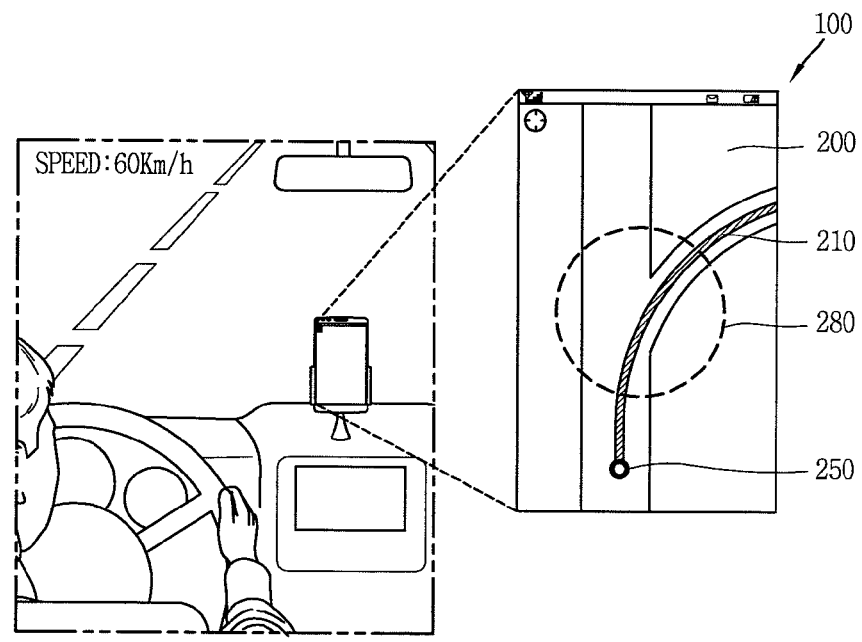
Figure 7B:
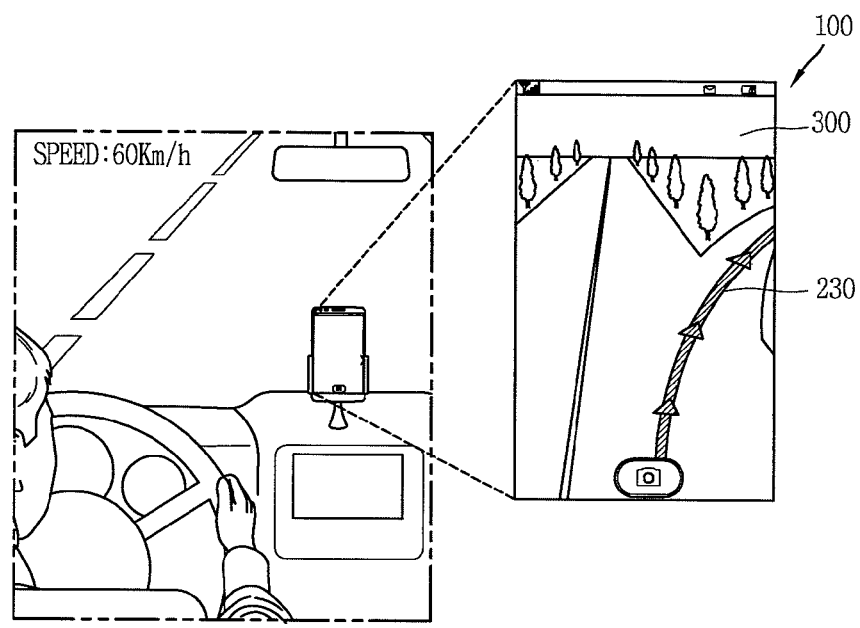

Hereinafter, a method of outputting a preview image according to another embodiment of the present invention will be explained in more detail with reference to the attached drawings. FIGS. 7A and 7B are conceptual views illustrating a method of outputting a preview image according to another embodiment of the present invention.

As aforementioned, if a movement of the mobile terminal 100 sensed in an output state of map information 200 corresponds to a preset type of movement, the controller 180 can output a preview image 300 overlapped with map information-related graphic objects, to at least part of a region where map information has been output.

The controller 180 can operate the camera based on a current position of the mobile terminal 100, and may output a preview image received through the camera. More specifically, if it is determined that the mobile terminal 100 is positioned at a crossroad 280, when map information 200 has been output to the display unit 151, the controller 180 can output a preview image 300 to at least part of a region where the map information 200 has been output.

Graphic objects related to the map information may be overlapped with the preview image 300. The controller 180 can determine whether the mobile terminal is positioned at the crossroad 280 or not, based on position information of the mobile terminal received through a GPS module.

When the mobile terminal enters the crossroad 280, the controller 180 can output notification information informing that a preview image can be output, or notification information informing that the mobile terminal has entered the crossroad 280. The notification information may be output in the form of vibration or sound, or may be output to the display unit 151.

When the mobile terminal enters the crossroad 280, the controller 180 can output an icon 400 related to a preview image output function, to the map information 200. For instance, as shown in FIG. 7A(a), map information 200 may be output to the display unit 151. An icon 250 indicating a current position of the mobile terminal may be output to the map information 200. A crossroad 280 may be output to the map information 200. The crossroad 280 may be set under control of the controller, or according to a user's request. A size of the crossroad 280 may be changed.

As shown in FIG. 7A(b), if it is determined that the mobile terminal 100 has entered the crossroad 280, the controller 180 can output notification information informing that a preview image can be output, or notification information informing that the mobile terminal has entered the crossroad 280. Further, the controller 180 can output an icon 400 related to a preview image output function, to the map information 200.

Upon selection of the icon 400 related to a preview image output function, the controller 180 can operate the camera, and may output a preview image 300 received through the camera, as shown in FIG. 7A(c). Graphic objects related to the map information may be overlapped with the preview image 300.

As another example, when map information 200 has been output to the display unit 151 as shown in FIG. 7B(a), if the mobile terminal 100 enters a crossroad 280 as shown in FIG. 7B(b), the controller 180 can output a preview image 300 overlapped with map information-related graphic objects, to at least part of a region where the map information 200 has been output.

If the mobile terminal 100 has been mounted to a vehicle as shown in FIG. 7B, the mobile terminal 100 may communicate with an image apparatus (e.g., a black box) provided at the vehicle. In this instance, if the mobile terminal (vehicle) enters the crossroad 280, the controller 180 can output an image received from the image apparatus, to the display unit 151. The controller 180 can overlap the image received from the image apparatus, with a graphic object related to the map information.

The controller 180 can output the image received from the image apparatus, together with a preview image received through the camera 121 of the mobile terminal 100. With such a configuration, a user can be provided with realistic map information from more various angles.

If at least one of the preview image and the image received from the image apparatus includes an image of the vehicle, the controller 180 can request and receive currently-set route information, from the mobile terminal provided at the vehicle, or a navigation device. If the route information received from the vehicle is the same as route information set to the mobile terminal 100, or if the received route information and the route information set to the mobile terminal 100 have the same route information at a crossroad, the controller 180 can output guide information instructing following the vehicle, to a preview image. The guide information may include information on a signpost of the vehicle, etc.

As aforementioned, in the present invention, when map information has been output, a preview image overlapped with graphic objects related to the map information, may be output based on a position of the mobile terminal. Thus, a user can be provided with a preview image overlapped with map information-related graphic objects, according to his or her desired conditions in various situations. This can enhance a user's convenience.

Figure 8A:
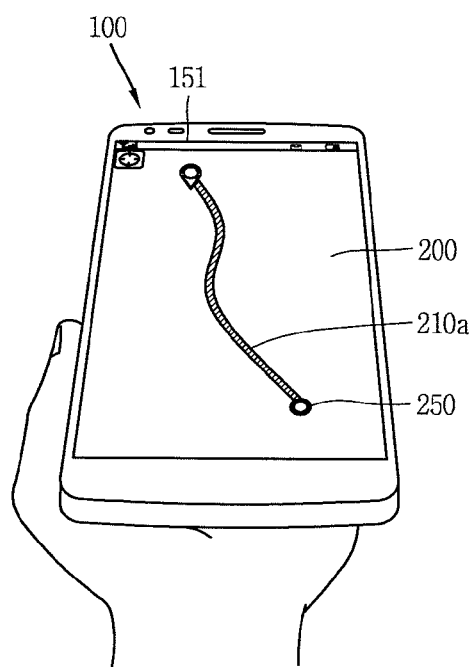
FIGS. 8(a) to 8(c) are conceptual views illustrating a method of changing route information set to map information, using a preview image.
Figure 8B:
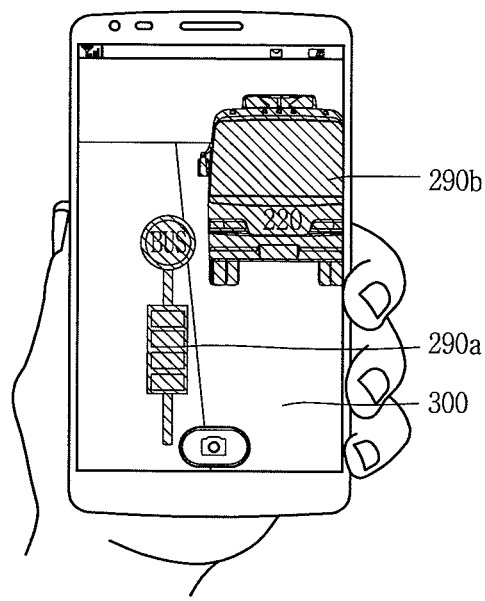
Figure 8C:
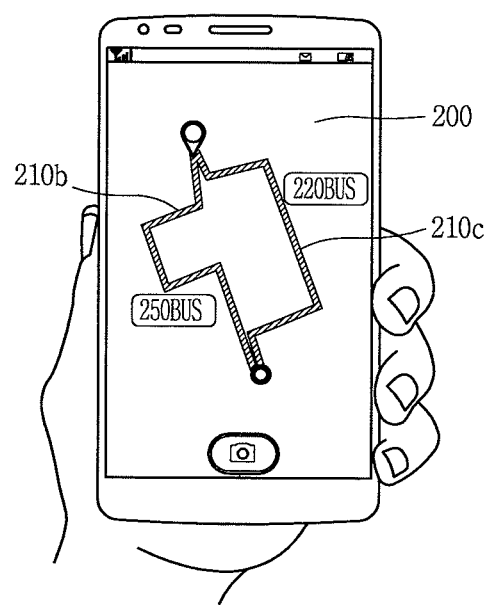

Hereinafter, a method of changing route information set to map information using a preview image will be explained in more detail with reference to the attached drawings. FIG. 8 is a conceptual view illustrating a method of changing route information set to map information, using a preview image.

Referring to FIG. 8(*a*), map information 200 may be output to the display unit 151. Route information 210*a* may be set to the map information 200. If a preset type of a movement of the mobile terminal 100 is sensed when the map information 200 has been output to the display unit 151, the controller 180 can output a preview image 300 to at least part of a region where the map information 200 has been output.

Graphic objects related to the map information 200 may be overlapped with the preview image 300. As shown in FIG. 8(*b*), the preview image 300 may include images corresponding to subjects related to traffic. The subjects related to traffic may include transportation means such as a vehicle, a motorcycle, a bus, a subway, a train, a ship and an airplane, and a place such as a bus stop, a subway station, a train station, an airport and a taxi stand.

The controller 180 can overlap graphic objects 290*a* and 290*b* with the images corresponding to subjects related to traffic. If one of the overlapped graphic objects 290*a* and 290*b* is selected, the controller 180 can restrict output of the preview image 300. Further, the controller 180 can change the route information 210*a* output to the map information 200, to other route information, based on selection of one of the overlapped graphic objects 290*a* and 290*b*.

For instance, as shown in FIG. 8(*b*), if the graphic object 290*a* overlapped with an image corresponding to a bus stop is selected among the graphic objects 290*a* and 290*b* overlapped with the preview image 300, the controller 180 can change the route information 210*a* set to the map information, to route information 210*b* and 210*c* informing a route to a set destination by transportation means which pass by the selected bus stop.

Further, if the graphic object 210*b* overlapped with an image corresponding to the transportation means is selected from the overlapped graphic objects 290*a* and 290*b*, the controller 180 can change the route information 210*a* set to the map information, to route information informing a route to a set destination by a transportation means corresponding to the selected graphic object 210*b*.

With such a configuration, a user needs not search for transportation means used to go to a destination, from map information. The user can set route information, through a simple touch, to a preview image. This can enhance a user's convenience.

The present invention has the following advantages. Firstly, if a movement of the mobile terminal corresponds to a preset type of movement, in an output state of map information, the controller may operate the camera, and may overlap one or more graphic objects related to the map information to a preview image received through the camera. Thus, a user can be provided with more realistic map information, as a preview image overlapped with map information-related graphic objects is output at a desired time point.

Secondly, a preview image, overlapped with graphic objects related to map information, can be output to part of a region where the map information has been output. As a result, a user's difficulty in alternately viewing the mobile terminal where map information has been output, and a realistic space in order to acquire his or her desired information, can be solved.

Thirdly, map information can be updated by using map information-related graphic object(s) output to a preview image. Thus, a user can easily check his or her desired information, using the updated map information.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

As the present features may be embodied in several forms without departing from the characteristics thereof, the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal, comprising:
   a camera configured to obtain an image;
   a display configured to output map information;
   a movement sensor configured to sense a movement of the mobile terminal; and
   a controller configured to:
   output a preview image received through operation of the camera to at least part of a region where the map information is output, when the movement of the mobile terminal corresponds to a preset type of movement while the map information is output, and
   display one or more graphic objects related to the map information as being overlapped on the preview image,
   wherein when one graphic object among the one or more graphic objects related to the map information is selected, the controller is further configured to:
   capture an image corresponding to the selected one graphic object,
   restrict output of the preview image based on selection of the one graphic object, and
   output the captured image to the map information.

2. The mobile terminal of claim 1, wherein the preset type of movement is a movement of the mobile terminal from a laid-down state at an angle less than a preset angle based on a ground surface to a stand-up state at an angle more than the preset angle.

3. The mobile terminal of claim 1, wherein the controller is further configured to determine the movement of the mobile terminal as the preset type of movement when the mobile terminal vibrates within a preset time a preset number of times.

4. The mobile terminal of claim 1, wherein the controller is further configured to output the preview image when a speed of the mobile terminal is changed from a first speed to a second speed different from the first speed.

5. The mobile terminal of claim 1, wherein the controller is further configured to:
   output an icon related to a preview image output function to the map information when the movement of the mobile terminal corresponds to the preset type of movement, and
   output the preview image based on selection of the icon.

6. The mobile terminal of claim 1, wherein the preview image includes at least one image corresponding to at least one subject, and
   wherein the controller is further configured to output the graphic object related to the map information to the at least one image or around the at least one image.

7. The mobile terminal of claim 6, wherein a type of the graphic object related to the map information is variable according to a type of the at least one image.

8. The mobile terminal of claim 6, wherein the controller is further configured to change an output position of the graphic object related to the map information according to a movement of the at least one image.

9. The mobile terminal of claim 1, wherein the controller is further configured to output the preview image to part of the region where the map information has been output, and an output position of the preview image becomes variable according to a direction that the camera faces.

10. The mobile terminal of claim 9, wherein the controller is further configured to output an indicator for guiding a direction that the camera faces to the map information.

11. A mobile terminal, comprising:
    a camera configured to obtain an image;
    a display configured to output map information;
    a movement sensor configured to sense a movement of the mobile terminal; and
    a controller configured to:
    output a preview image received through operation of the camera to at least part of a region where the map information is output, when the movement of the mobile terminal corresponds to a preset type of movement while the map information is output, and
    display one or more graphic objects related to the map information as being overlapped on the preview image, wherein the preview image includes at least one image corresponding to at least one subject, and the graphic object related to the map information is output to the at least one image or around the at least one image,
    wherein when the graphic object related to the map information is selected, the controller is further configured to:
    capture an image corresponding to the selected graphic object,
    restrict output of the preview image based on selection of the graphic object, and
    output the captured image to a point on the map information where a subject corresponding to the captured image is positioned.

12. A mobile terminal, comprising:
    a camera configured to obtain an image;

a display configured to output map information including first route information;

a movement sensor configured to sense a movement of the mobile terminal; and a controller configured to:

output a preview image received through operation of the camera to at least part of a region where the map information is output, when the movement of the mobile terminal corresponds to a preset type of movement while the map information is output, wherein a graphic object related to the first route information is output to the preview image, and output a graphic object related to second route information different from the first route information if the preview image is output when the mobile terminal is positioned at a crossroad on the map information, wherein when the graphic object related to the second route information is selected, the controller is further configured to restrict output of the preview image, and change the first route information output to the map information to the second route information.

13. The mobile terminal of claim 12, wherein the controller is further configured to output detailed information on the first route information and the second route information to the map information.

* * * * *